United States Patent [19]

Jensen

[11] Patent Number: 4,580,961
[45] Date of Patent: Apr. 8, 1986

[54] CHEESE MOULD

[75] Inventor: Finn Jensen, Horsens, Denmark

[73] Assignee: Mejeriselskabet Danmark A.m.b.A., Aarhus, Denmark

[21] Appl. No.: 546,200

[22] PCT Filed: Feb. 22, 1983

[86] PCT No.: PCT/DK83/00019
§ 371 Date: Oct. 13, 1983
§ 102(e) Date: Oct. 13, 1983

[87] PCT Pub. No.: WO83/02875
PCT Pub. Date: Sep. 1, 1983

[30] Foreign Application Priority Data

Feb. 22, 1982 [DK] Denmark ............................ 756/82

[51] Int. Cl.[4] ........................ B29C 1/00; A01J 25/13; A01J 25/11
[52] U.S. Cl. .................................... 425/84; 99/458; 210/498; 249/141
[58] Field of Search ................... 425/84, 85; 210/488, 210/489, 498; 99/458, 465; 100/104, 109, 110, 126, 127, 128; 249/141

[56] References Cited

U.S. PATENT DOCUMENTS

| | | | |
|---|---|---|---|
| 1,399,977 | 12/1921 | Merle | 249/113 |
| 1,503,673 | 8/1924 | Upton | 100/127 |
| 2,025,213 | 12/1935 | Miollis | 99/458 |
| 2,419,155 | 4/1947 | Orton | 210/498 |
| 2,845,857 | 8/1958 | Robertson et al. | 100/127 |
| 3,277,814 | 10/1966 | Malm et al. | 210/498 |
| 3,370,713 | 2/1968 | Stevens | 210/488 |
| 3,647,084 | 3/1972 | Martin | 210/488 |
| 3,838,955 | 10/1974 | Dubbeld | 249/113 |
| 3,969,995 | 7/1976 | Krueger et al. | 99/458 |
| 4,156,651 | 5/1979 | Mehoudar | 210/488 |
| 4,358,370 | 11/1982 | Jameson et al. | 210/498 |

FOREIGN PATENT DOCUMENTS

| | | | |
|---|---|---|---|
| 90378 | 9/1953 | Denmark . | |
| 749787 | 3/1944 | Fed. Rep. of Germany | 100/127 |
| 2113312 | 10/1972 | Fed. Rep. of Germany . | |
| 2233929 | 6/1973 | France . | |
| 365102 | 3/1974 | Sweden . | |
| 360590 | 4/1962 | Switzerland | 100/126 |
| 461521 | 5/1976 | U.S.S.R. | 425/84 |

Primary Examiner—Willard E. Hoag
Attorney, Agent, or Firm—Lowe King Price & Becker

[57] ABSTRACT

An oblong cheese mould (1) having a substantially constant cross-section has in its side wall (3) slits (2) for drainage of whey from the cheese mass received by the cheese mould. According to the invention, the slits (2) extend transversely to the longitudinal direction of the mould, and their width, measured internally in the longitudinal direction of the cheese mould (1), is smaller than the cheese particles in the cheese mass, and the bottom (14) of the slits (2) facing the exterior of the mould is substantially closed, apart from channels (4) for drainage of the whey. This causes the cheese to be movable longitudinally of the mould because of its own weight so that the cheese obtains a very smooth surface, and thus the mould easily releases the cheese.

10 Claims, 5 Drawing Figures

U.S. Patent  Apr. 8, 1986  4,580,961
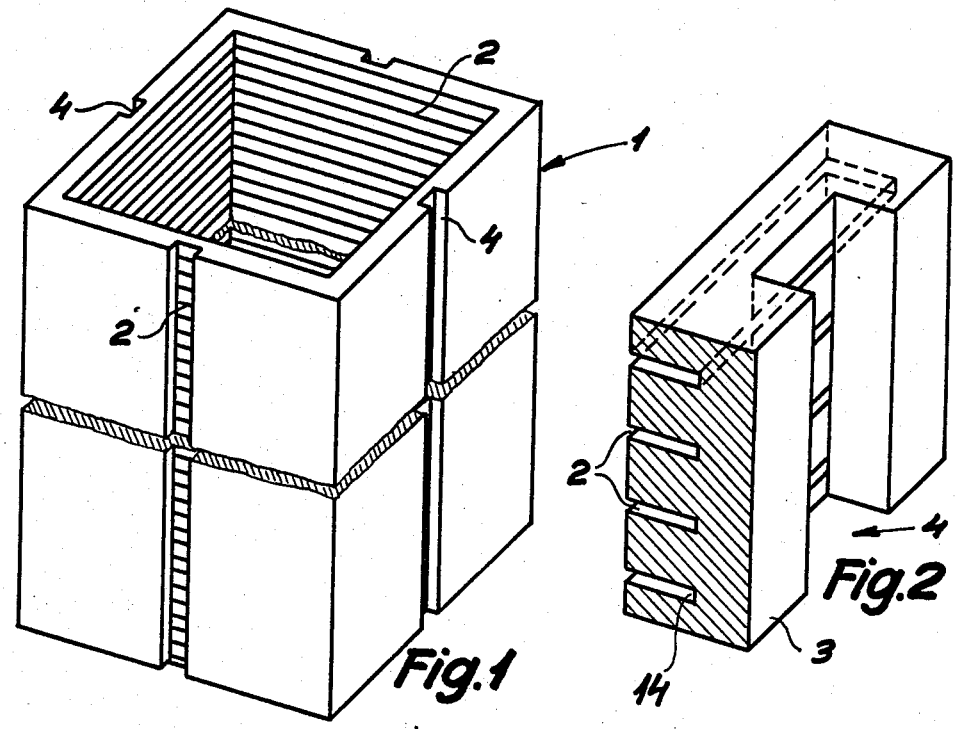
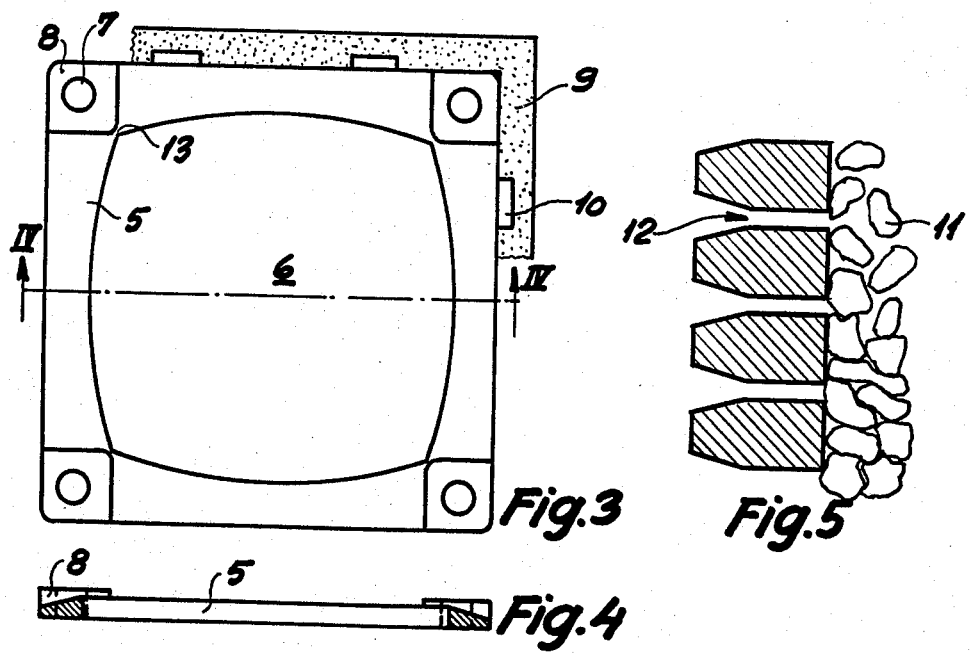

CHEESE MOULD

The invention concerns a cheese mould consisting of an elongate pipe with a substantially constant cross-section to receive a cheese mass in the form of cheese particles and whey, the wall of the mould being provided with a plurality of slits for drainage of liquid when the mould is essentially vertically disposed.

The latter transport of liquid concerns in particular drainage of the whey from the cheese mass, but may also take place during salting of the cheese as the cheese mould is immersed in a brine.

A cheese mould of the present type is known e.g. from German Patent Specification No. 929 945 showing a cheese mould with a plurality of vertical slits. When a cheese mould has stood for some time after having been filled with cheese mass, so much whey will have escaped that the particles of cheese begin gathering to form a coherent elastic mass, and then the cheese mould is usually inverted. Normally, the mould is inverted several times before the cheese is removed from the mould and/or is placed in a brine. It was believed in the past that these slits should preferably extend longitudinally of the cheese mould in order for the above-mentioned operations to be performed satisfactorily, i.e. for the cheese mass to be movable in the longitudinal direction of the mould and be readily removable from it, which is e.g. not the case with moulds having a large number of holes, as is known e.g. from Danish Patent Specification No. 90378.

The object of the invention is to provide a cheese mould which involves a surprising improvement over the prior art, with respect to the discharge of the whey as well as with respect to the tendency of the mould to release the cheese.

This object is achieved by arranging grooves or slits formed in side walls of the mold so that they extend transverse with respect to the longitudinal direction of the mold. Each slit has a width smaller than the size of the cheese particles, and the predominant part of the bottom of the slits forming the mold extension is closed. When the cheese mass sets in the mould and whey penetrate into the grooves, cheese particles are pressed a distance into the grooves, and it might be expected that the cheese particles protruding into the grooves would prevent the cheese mass from sliding downwards in the mould upon inversion of it. However, the stated slit width is sufficiently small for the elasticity and weight of the cheese, when hanging at the top of the inverted mould, to cause the protruding particles to be drawn clear of the slits, provided the friction is sufficiently small. The slit shape according to the invention involves a sufficiently small friction because the predominantly closed slits ensure a moist atmosphere so that the protruding cheese portions maintain a relatively wet and thus smooth surface. The horizontal or approximately horizontal slits cause the whey to run off relatively slowly so that residue of whey may be present in the slits after the mould has been inverted, and such residue serves as a lubricant to reduce friction.

Cheese particles having worked themselves a short distance into the slits are therefore easily drawn clear when the cheese mould is inverted, and the cheese mass is therefore effectively displaced transversely to the slits. This provides a very uniform discharge of the whey, and the constant movement of the surface of the cheese mass into and out of the slits imparts a very smooth surface to the cheese and causes the mould to release the cheese very easily. To bring about the abovementioned advantages as well as a good rind formation the distance between adjacent slits is about 2 to 5 times greater than the slit width.

An embodiment of the cheese mould of the invention may be provided by the provision in the inside of walls forming the cheese mould of a large number of parallel slits, which extend from the inner surface of the mould a distance into the wall of the mould and communicate with a plurality of longitudinal drainage channels in the outer surface of the mould walls. However, the mould of the invention may also be produced as a stack of slats stacked longitudinally with the slits formed between adjacent slats. In accordance with a further aspect of the invention, opposite sides of each slit are generally parallel to each other, apart from narrow belt portions thereof along the mold where the slit sides forming the mold extension diverge.

The slits restrain the whey, which is exclusively drained through the narrow belts. The slit width (measured internally in the longitudinal direction of the cheese mould) is typically of the order of 0.2 to 1 mm, preferably 0.5 to 0.7 mm.

To facilitate cleaning of the mould it can comprise an inner pipe or slits and an outer jacket formed with longitudinal chambers for draining whey. The inner tube may be made of metal, while the outer jacket may be formed to provide for the necessary heat insulation. Alternatively, the entire cheese mould may be made of a heat insulating material, such as wood or plastics.

The invention will be explained more fully by the following description of some embodiments with reference to the drawing, in which FIG. 1 shows a first embodiment of the cheese mould of the invention, FIG. 2 is a close-up of the wall from the cheese mould shown in FIG. 1, FIG. 3 is a plan view of a slat for the construction of another embodiment of the cheese mould of the invention, FIG. 4 is a section along the line IV—IV in FIG. 3, while FIG. 5 is a segment of a cross-section of the cheese mould through one of its drainage belts.

FIG. 1 shows an embodiment of a cheese mould 1 of the invention, the mould being significantly longer than its transverse dimensions in practice. In the operative position the mould is vertical, so its internal side faces are provided with a large number of horizontal slits 2, which can be seen more clearly on the segment of the cheese mould wall shown in FIG. 2. The slits 2 extend only partly into the side wall 3, which on the other hand has some vertical grooves or drainage belts 4 cut so deep into the side 3 that the slits 2 communicate with the grooves 4. Thus, the grooves 4 constitute discharge chutes for the whey running from the cheese mass in the mould 1 through the grooves 2. The opposite surfaces of the slits are preferably mutually parallel, while the slits may have the cross-section in the drainage belts which is shown in FIG. 5.

The cheese mould of the invention may also be produced in the form of a stack of slats, such as the slat shown in FIG. 3. The slat 5 consists of a plate with an internal hole 6, each of the plate corners having holes 7 for receiving a stay bolt serving to clamp a large number of slats together to a shape which corresponds to the internal part of the mould from FIG. 1. FIG. 4 shows a section along the line IV—IV in FIG. 3, from which it appears that the wall thickness of the slat in the regions 8 around the holes 7 is thicker than the wall thickness of the rest of the slat; thus, stacking of the slats 5 on top of each other results in a pipe where the described slits extend everywhere from the internal side of the pipe to its external side, and the regions 8 do not extend right into the hole 6, cf. the gap designated by 13. The side faces of the slats may moreover be provided with pins and complementary holes for the provision of spacing stabilizers and/or coupling means.

To additionally heat insulate the cheese mass from the surroundings, the cheese mould may be encircled by an insulating jacket, a fragment of which being schematically shown at 9 in FIG. 3; this jacket has longitudinal discharge chutes 10. The jacket 9 is of course removed before the cheese mould is dipped into a brine, or when the cheese mould is to be cleaned.

To illustrate the invention, FIG. 5 shows a vertical segment of the cheese mould wall through a drainage belt whose inner side is shown to have a plurality of cheese particles thereon. The cheese particles 11 are spaced at the top, the gap being filled with whey, while the lower cheese particles have begun coalescing because the whey is driven off more rapidly at the bottom of the mould where the pressure from the overlying cheese mass is greatest. When the cheese particles 11 have coalesced, the cheese mould is inverted so that the cheese mass, which is now elastic, is stretched a little in the mould. Though the cheese particles protrude partly into the slits 12, the cohesion between the cheese particles is great enough to ensure that the cheese particles are drawn out of the slits because the almost closed and substantially horizontal slits cause the cheese protrusions to be moist and smooth (in the prior art the cheese dries a little so that the coefficient of friction increases) and free whey to be present in the slits after the mould has been inverted (in the prior art it is drained too rapidly), which brings about a very small coefficient of friction. The elastic movement of the cheese mass causes varying parts of the cheese mass to be disposed opposite the slits 12 so the last part of the whey is driven off considerably more effectively than was known in the past. Moreover, the constant movement of the cheese particles with respect to the slits 12 causes the cheese surface to be very smooth and the mould to release the cheese easily when the cheese is to be removed from it.

It will be appreciated that the cheese mould of the invention is not restricted to the described cross sectional shapes as the substantially constant crosssection of the cheese may also have a round, square or other shape.

I claim:

1. A cheese mould comprising means for establishing a side wall defining a mould cavity having a substantially constant cross-section to receive a cheese mass in the form of cheese particles and whey, an inner surface of the wall facing the mould cavity being provided with a plurality of slits for drainage of liquid when the mould is essentially vertically disposed, said slits extending transversely to the longitudinal axis of the mould cavity and having a slit width which is smaller than the size of the cheese particles to prevent said particles from protruding into the slits, an exterior surface of the mould side wall including a longitudinal drainage channel facing the mould exterior and in communication with a minor part of the bottom of the slits, the slits and drainage channel thereby being arranged so that the predominant part of the bottom of the slits facing the exterior of the mould is closed to the exterior to increase concentration of whey in close proximity to the cheese particles to provide for increased lubrication and to prevent formation of a dry surface layer of the cheese particles, said mould having plural side walls and edges of said walls defining at least one open end of said mould through which the cheese mass is releasable from the mould cavity by traveling in a direction generally perpendicular to said slits.

2. A cheese mould according to claim 1, wherein the distance between adjacent slits is about 2 to 5 times greater than the slit width.

3. A cheese mould according to claim 1, wherein said mould is formed of a plurality of slats stacked longitudinally, said slits being respectively established between adjacent slats.

4. A cheese mould according to claim 1, wherein opposite sides of each slit are generally parallel to each other, apart from a plurality of narrow belts formed along the cheese mould by outer diverging portions of said opposite slit sides facing the exterior of the mould.

5. A cheese mould according to claim 1, wherein said mould includes an inner pipe having said slits extending therethrough and an outer jacket formed with longitudinal channels in communication with openings formed in the bottoms of the slits for draining whey.

6. A cheese mould according to claim 5, wherein said outer jacket is formed of heat insulation material.

7. A cheese mould according to claim 1, wherein said mould is made of plastics, wood and like heat insulating materials.

8. The mould of claim 1, wherein the side wall of said mould forming the cavity is incapable of being opened, said mould thereby being a closed vertical mould.

9. The cheese mould of claim 1, wherein each slit extends continuously along the interior surface of the mould cavity and is thereby endless.

10. A cheese mould comprising means for establishing a side wall defining a mould cavity having a substantially constant cross-section to receive a cheese mass in the form of cheese particles and whey, an inner surface of the wall facing the mould cavity being provided with a plurality of slits for drainage of liquid when the mould is essentially vertically disposed, said slits extending transversely to the longitudinal axis of the mould cavity and having a slit width which is smaller than the size of the cheese particles to prevent said particles from protruding into the slits, an exterior surface of the mould side wall including a longitudinal drainage channel facing the mould exterior and in communication with a minor part of the bottom of the slits, the slits and drainage channel thereby being arranged so that the predominant part of the bottom of the slits facing the exterior of the mould is closed to the exterior to increase concentration of whey in close proximity to the cheese particles to provide for increased lubrication and to prevent formation of a dry surface layer of the cheese particles, said mould having plural side walls and edges of said walls, being substantially parallel to said slits, defining at least one open end of said mould.

* * * * *